United States Patent
Ganguli et al.

(10) Patent No.: US 10,110,671 B2
(45) Date of Patent: Oct. 23, 2018

(54) METHOD, SYSTEM, AND DEVICE FOR MANAGING SERVER HARDWARE RESOURCES IN A CLOUD SCHEDULING ENVIRONMENT

(71) Applicant: Intel Corporation, Santa Clara, CA (US)

(72) Inventors: Mrittika Ganguli, Bangalore (IN); Mohan J. Kumar, Aloha, OR (US); Deepak S, Bangalore (IN); Jaiber J. John, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 224 days.

(21) Appl. No.: 14/961,219

(22) Filed: Dec. 7, 2015

(65) Prior Publication Data
US 2016/0164963 A1  Jun. 9, 2016

Related U.S. Application Data

(63) Continuation of application No. 13/538,167, filed on Jun. 29, 2012, now Pat. No. 9,207,988.

(51) Int. Cl.
*G06F 15/173* (2006.01)
*H04L 29/08* (2006.01)
(Continued)

(52) U.S. Cl.
CPC ........ *H04L 67/1014* (2013.01); *G06F 9/5072* (2013.01); *H04L 41/12* (2013.01);
(Continued)

(58) Field of Classification Search
CPC ............ H04L 41/5058; H04L 41/5096; G06F 9/5072
See application file for complete search history.

(56) References Cited

U.S. PATENT DOCUMENTS 6,826,606 B2  11/2004  Freeman et al.
7,031,700 B1  4/2006  Weaver et al.
(Continued)

FOREIGN PATENT DOCUMENTS

CN  102045337 A  5/2011
CN  102150150 A  8/2011
(Continued)

OTHER PUBLICATIONS

International Search Report and Written Opinion received for International Application No. PCT/US2013/047121, dated Aug. 27, 2013, 10 pages.
(Continued)

*Primary Examiner* — Yves Dalencourt
(74) *Attorney, Agent, or Firm* — Barnes & Thornburg LLP

(57) ABSTRACT

A method, system, and device for managing hardware resources in a cloud scheduling environment includes a zone controller. The zone controller can manage groups of node servers in a cloud datacenter using a checkin service. The checkin service allows server groups to be created automatically based on one or more hardware characteristics of the node servers, server health information, workload scheduling or facilities management parameters, and/or other criteria.

23 Claims, 6 Drawing Sheets

(51) Int. Cl.
*G06F 9/50* (2006.01)
*H04L 12/24* (2006.01)

(52) U.S. Cl.
CPC ...... *H04L 41/5058* (2013.01); *H04L 41/5096* (2013.01); *H04L 67/1002* (2013.01)

(56) References Cited

U.S. PATENT DOCUMENTS

| | | | |
|---|---|---|---|
| 2010/0010975 A1* | 1/2010 | Morris | H04L 29/12066 707/E17.014 |
| 2010/0076933 A1 | 3/2010 | Hamilton et al. | |
| 2010/0325191 A1 | 12/2010 | Jung et al. | |
| 2011/0087766 A1 | 4/2011 | Kuo et al. | |
| 2011/0153812 A1 | 6/2011 | Yoon et al. | |
| 2012/0005274 A1 | 1/2012 | Lee et al. | |
| 2012/0020370 A1 | 1/2012 | Sonnier et al. | |

FOREIGN PATENT DOCUMENTS

| | | |
|---|---|---|
| KR | 1020100138689 A | 12/2010 |
| KR | 1020110073162 A | 6/2011 |
| KR | 1020120003356 A | 1/2012 |
| WO | 2014004318 A1 | 1/2014 |

OTHER PUBLICATIONS

"Zero Configuration Networking (Zeroconf)," available at http://zeroconf.org, 4 pages.
www.amqp.org, 2 pages.
"VMware vFabric RabbitMQ™,"http://vmware.com/products/application-platform/vfabric-rabbitmq/overview.html, 2 pages.
http://nova.openstack.org/devref.
Chinese Office Action and English Translation for Patent Application No. 201380027938.6, dated May 4, 2016, 38 pages.
English Translation of Chinese Office Action for Patent Application No. 201380027938.6, dated Dec. 26, 2016, 12 pages.
Chinese Office Action and English Translation for Patent Application No. 201380027938.6, dated Jul. 3, 2017, 9 pages.

* cited by examiner

METHOD, SYSTEM, AND DEVICE FOR MANAGING SERVER HARDWARE RESOURCES IN A CLOUD SCHEDULING ENVIRONMENT

CROSS-REFERENCE TO RELATED APPLICATION

The present application is a continuation application of U.S. application Ser. No. 13/538,167, entitled "METHOD, SYSTEM, AND DEVICE FOR MANAGING SERVER HARDWARE RESOURCES IN A CLOUD SCHEDULING ENVIRONMENT," which was filed on Jun. 29, 2012.

BACKGROUND

"Cloud" computing often refers to the provision of computing resources as a service, usually by a number of computer servers that are networked together at a location that is remote from the location from which the services are requested. A cloud datacenter refers to the physical arrangement of servers that make up a cloud or a particular portion of a cloud. For example, servers can be physically arranged in the datacenter into rooms, groups, rows, and racks. A datacenter may have one or more zones, which may include one or more rooms of servers. Each room may have one or more rows of servers, and each row may include one or more racks. Each rack may include one or more individual server nodes. Servers in zones, rooms, racks, and/or rows may be arranged into groups based on physical infrastructure requirements of the datacenter facility, which may include power, energy, thermal, heat, and/or other requirements.

Notwithstanding its physical location within a datacenter, a server or portions of its resources may be allocated (e.g., for use by different customers of the datacenter) according to actual or anticipated use requirements, such as security, quality of service, throughput, processing capacity, and/or other criteria. As an example, one customer's computing workload may be divided among multiple physical servers (which may be located in different rows, racks, groups, or rooms of the datacenter), or among multiple processes on the same server, using virtualization. Thus, in the context of virtualization, servers can be grouped logically to satisfy workload requirements.

A cloud scheduling system refers to computer software that is used to manage the server resources in a cloud datacenter. Cloud scheduling systems attempt to reconcile customers' workload requirements with facilities management criteria and/or other requirements, and allocate the cloud's server resources accordingly. In some cases, scheduling may be complicated by physical configurations that contain heterogeneous groups of servers, e.g., zones, rooms, groups, rows, or racks in which individual servers have different hardware configurations. This can be a common occurrence, as many datacenters replace or upgrade servers only as needed (e.g., rather than upgrading an entire group at once), for cost reasons or otherwise.

BRIEF DESCRIPTION

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

Figure 1:
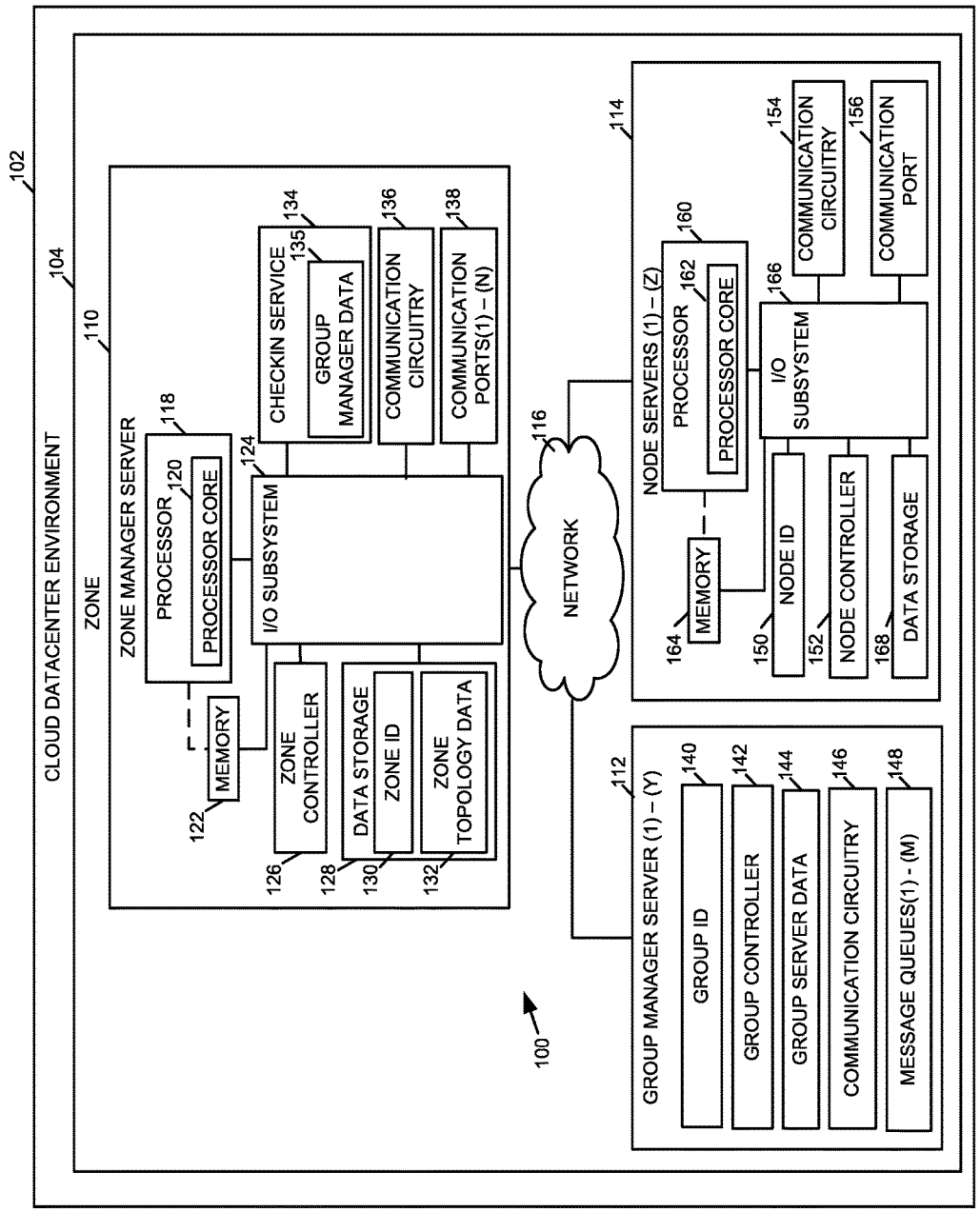
FIG. 1 is a simplified block diagram of at least one embodiment of a system for managing server hardware resources in a cloud datacenter environment.

While the concepts of the present disclosure are susceptible to various modifications and alternative forms, specific embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated by one skilled in the art, however, that embodiments of the disclosure may be practiced without such specific details. In other instances, control structures, gate level circuits and full software instruction sequences have not been shown in detail in order not to obscure the description of the of the concepts described herein. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the concepts described herein may be implemented in hardware, firmware, software, or any combination thereof. Embodiments implemented in a computer system may include one or more point-to-point or bus-based interconnects between components. Embodiments of the concepts described herein may also be implemented as instructions carried by or stored on one or more machine-readable or computer-readable storage media, which may be read and executed by one or more processors. A machine-readable or computer-readable storage medium may be embodied as any device, mechanism, or physical structure for storing or transmitting information in a form readable by a machine (e.g., a computing device). For example, a machine-readable or computer-readable storage medium may be embodied as read only memory (ROM) device(s); random access memory (RAM) device(s); magnetic disk storage media; optical storage media; flash memory devices; mini- or micro-SD cards, memory sticks, and others.

In the drawings, specific arrangements or orderings of schematic elements, such as those representing devices, modules, instruction blocks and data elements, may be shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

In general, schematic elements used to represent instruction blocks may be implemented using any suitable form of machine-readable instruction, such as software or firmware applications, programs, functions, modules, routines, processes, procedures, plug-ins, applets, widgets, code fragments and/or others, and that each such instruction may be implemented using any suitable programming language, library, application programming interface (API), and/or other software development tools. For example, some embodiments may be implemented using Java, C++, and/or other programming languages. Similarly, schematic elements used to represent data or information may be implemented using any suitable electronic arrangement or structure, such as a register, data store, table, record, array, index, hash, map, tree, list, graph, file (of any file type), folder, directory, database, and/or others.

Further, in the drawings, where connecting elements, such as solid or dashed lines or arrows, are used to illustrate a connection, relationship or association between or among two or more other schematic elements, the absence of any such connecting elements is not meant to imply that no connection, relationship or association can exist. In other words, some connections, relationships or associations between elements may not be shown in the drawings so as not to obscure the disclosure. In addition, for ease of illustration, a single connecting element may be used to represent multiple connections, relationships or associations between elements. For example, where a connecting element represents a communication of signals, data or instructions, it should be understood by those skilled in the art that such element may represent one or multiple signal paths (e.g., a bus), as may be needed, to effect the communication.

Traditionally, cloud scheduling systems rely on centralized workload management software to initially identify all of the servers in the datacenter and determine when new servers are added by periodically polling the network. The management software typically creates and maintains a list of all of the IP addresses in the cloud. This top-down approach to server management is not as useful in cloud datacenter environments in which the hardware configurations, workload requirements, health status of individual servers, and/or facilities management policies can change frequently, or in which it may be desirable to allow individual servers to be used to satisfy multiple different or overlapping requirements.

Referring now to FIG. 1, in one embodiment, a system 100 for managing server hardware in a zone 104 of a cloud datacenter environment 102 (which may include multiple zones) includes a zone manager server 110. The illustrative zone manager server 110 operates a zone controller 126 and a checkin service 134. As described in detail below, the zone controller 126 and the checkin service 134 enable individual node servers 114 to initiate the process of joining the zone 104. The system 100 also includes one or more group manager servers 112, each of which manages a group of one or more of the node servers 114. Each group manager server 112 can initiate the process of adding its group to the zone 104. The illustrative zone controller 126 can create groups and assign nodes to groups based on capabilities of the processor hardware, including real-time "server health" data, that are available at each node server 114, and/or other criteria. The illustrative group controller 142 can collect a variety of data from the node servers 114 in its group, which can be used to create or modify groups, for monitoring, generating alerts, and/or for other purposes. In this way, server hardware resources in a cloud datacenter environment can be allocated and managed dynamically in response to changes in processor capabilities, server health issues, and/or a variety of other parameters, without incurring the overhead of a top-down approach.

The illustrative zone manager server 110 includes at least one processor 118, memory 122, an input/output (I/O) subsystem 124, at least one data storage device 128, and communication circuitry 136. The zone manager server 110 may be embodied as any suitable type of server computer or other computing device capable of performing the functions and features described herein as being performable by the zone manager server 110 or any of its components. For example, the zone manager server 110 may be embodied as a computer, a personal computer (PC), a desktop computer, a laptop computer, a notebook computer, a handheld computer, a server, a server array or server farm, a web server, a network server, an enterprise server, an Internet server, a work station, a mini-computer, a main frame computer, a supercomputer, a network appliance, a web appliance, a distributed computing system, multiprocessor systems, processor-based systems, or combination of any of the foregoing.

The illustrative processor 118 includes at least one processor core 120. In addition to an amount of cache memory, the processor 118 includes, or is otherwise communicatively coupled to, the memory 122. The memory 122 may be embodied as any type of suitable memory device, such as a dynamic random access memory device (DRAM), synchronous dynamic random access memory device (SDRAM), double-data rate dynamic random access memory device (DDR SDRAM), and/or other volatile memory device.

The processor 118 is also communicatively coupled to the I/O subsystem 124. While not specifically shown, the illustrative I/O subsystem 124 may include a memory controller (e.g., a memory controller subsystem or northbridge), an input/output controller (e.g., an input/output controller subsystem or southbridge), and a firmware device. Of course, in other embodiments, I/O subsystems having other configurations may be used. For example, in some embodiments, the I/O subsystem 124 may form a portion of a system-on-a-chip (SoC) and be incorporated, along with the processor 118 and other components of the zone manager server 110, on a single integrated circuit chip. As such, it will be appreciated that each component of the I/O subsystem 124 may be located on a common integrated circuit chip in some embodiments.

The I/O subsystem 124 is communicatively coupled to the zone controller 126, the checkin service 134, the data storage device 128, the communication circuitry 136, and one or more communicate ports 138. The zone controller 126 is embodied as one or more computerized programs, logic and/or instructions (e.g., software and/or firmware) that are configured to manage the arrangement of server computers in the zone 104. Details relating to the operation of the zone controller 126 are described below with reference to FIGS. 2 and 3. The checkin service 134 is embodied as one or more computerized programs, logic and/or instructions (e.g., software and/or firmware) that are configured to manage requests from various computer servers (e.g., group manager servers 112 and/or node servers 114) to join the zone 104. Details relating to the operation of the checkin service 134 are described below with reference to FIGS. 2 and 4.

Portions of the data storage device 128 may be embodied as any suitable device for storing data and/or computer instructions, such as disk storage (e.g., hard disks), a network of physical and/or logical storage devices, and/or others. In the illustrative embodiment, a zone identifier 130 and zone topology data 132 reside in the data storage device 128. In addition, portions of the zone controller 126 and/or the checkin service 134 may reside in the data storage 128. Portions of the zone identifier 130, the zone topology data 132, the zone controller 126, and/or the checkin service 134 may be copied to the memory 122 during operation, for faster processing or other reasons.

The communication circuitry 136 may be embodied as one or more devices and/or circuitry configured to enable communications between or among the zone manager server 110, the group manager server(s) 112, and/or the server node(s) 114, via a communication network 116. The communication circuitry 136 may include one or more wired and/or wireless network interfaces or "cards" to facilitate communications over the wired and/or wireless portions of the network 116. As described below, the communication port(s) 138 are used by the zone controller 126 to exchange communications with the group manager server(s) 112 and/or the node server(s) 114. Any suitable number of communication ports, 1 to N, where N is a positive integer, may be provided according to the requirements of a particular design or implementation of the system 100.

Although not specifically shown, the I/O subsystem 124 may be communicatively coupled to one or more peripheral device(s), such as a display, touchpad, keypad, microphone, speaker, and/or others, depending upon, for example, the intended use of the zone manager server 110. Further, it should be appreciated that the zone manager server 110 may include other components, sub-components, and devices not illustrated in FIG. 1 for clarity of the description.

The group manager server(s) 112 may be embodied as any suitable type of server computer or other computing device capable of performing the functions and features described herein as being performable by the group manager server(s) 112 or any of its components. For example, the group manager server(s) 112 may be embodied as any of the types of computing devices mentioned above in the description of the zone manager server 110. In general, the group manager server(s) 112 include hardware components (e.g., processor, memory, I/O subsystem, data storage, communication circuitry) similar or analogous to those described above in connection with the zone manager server 110; therefore, those descriptions are not repeated here. Any suitable number, 1 to Y, where Y is a positive integer, of group manager servers 112 may be included in the zone 104, according to the requirements of a particular design or implementation of the system 100.

The group controller 142 is embodied as one or more computerized programs, logic and/or instructions (e.g., software and/or firmware) that are configured to manage the arrangement of node servers 114 in the group of servers managed by the group manager server 112, using a group identifier 140, group server data 144, and message queues or channels 148. The group controller 142 can initiate the process of joining the zone 104 and/or any other zone of the datacenter environment 102, using its group identifier 140. Any suitable number, 1 to M, where M is a positive integer, of message queues 148, may be provided at a group manager server 112, depending on the requirements of a particular design or implementation of the system 100. In general, the message queues 148 are configured to receive status messages from node servers 114 in the group. Details relating to the operation of the group controller 142 are described below with reference to FIGS. 2 and 5.

The node server(s) 114 may be embodied as any suitable type of server computer or other computing device capable of performing the functions and features described herein as being performable by the node server(s) 114 or any of its components. For example, the node server(s) 114 may be embodied as any of the types of computing devices mentioned above in the description of the zone manager server 110. In general, the node server(s) 114 include hardware components (e.g., processor, memory, I/O subsystem, data storage, communication circuitry) similar or analogous to those described above in connection with the zone manager server 110. The illustrative node server(s) 114 includes at least one processor 160. The illustrative processor 160 includes at least one processor core 162. In addition to an amount of cache memory, the processor 160 includes, or is otherwise communicatively coupled to, the memory 164. The processor 160 is also communicatively coupled to the I/O subsystem 166. The I/O subsystem 166 is communicatively coupled to the node identifier 150, the node controller 152, the communication circuitry 154, the communication port 156, and the data storage device 168. Portions of the data storage device 168 may be embodied as any suitable device for storing data and/or computer instructions, such as disk storage (e.g., hard disks), a network of physical and/or logical storage devices, and/or others. Any suitable number, 1 to Z, where Z is a positive integer, of node servers 114 may be included in the zone 104, according to the requirements of a particular design or implementation of the system 100.

The node controller 152 is embodied as one or more computerized programs, logic and/or instructions (e.g., software and/or firmware) that are configured to manage communication of a node server 114 with other components of the system 100, using, among other things, communication circuitry 154 and a communication port 156. Portions of the node controller 152 and/or the node identifier 150 may reside in the data storage device 168. In some embodiments, the node identifier 150 may be stored in non-volatile memory associated with the processor 160 or processor core 162 (e.g., in flash memory). Details relating to the operation of the node controller 152 are described below with reference to FIGS. 2 and 6.

The network 116 may be embodied as any type of wired and/or wireless telecommunications network. For example, the network 116 may be embodied as or otherwise include one or more public or private cellular networks, telephone, Digital Subscriber Line (DSL) or cable networks, local or wide area networks, publicly available global networks (e.g., the Internet), or any combination thereof. For example, in some embodiments, the network 116 may be embodied as or otherwise include a Global System for Mobile Communications (GSM) cellular network. Additionally, the network 116 may include any number of additional devices as needed to facilitate communication between or among the zone manager server 110, the node servers 114, and the group manager servers 112, such as routers, switches, intervening computers and/or others. Any suitable communication protocol (e.g., TCP/IP) may be used to effect communication over the network 116, depending on, for example, the particular type or configuration of the network 116. In the some embodiments, a broadcast messaging framework and/or "publish and subscribe" communication environment may be used. For example, in some embodiments, a Zero Configuration Networking (Zeroconf) or similar network communication environment may be used in combination with an Advanced Message Queueing Protocol (AMQP), Active Message Queueing ("Active MQ"), or similar messaging framework.

In general, the components of the zone manager server 110, the group manager server(s) 112, and the node server(s) 114 are communicatively coupled as shown in FIG. 1, by one or more signal paths. Such signal paths may be embodied as any type of wired or wireless signal paths capable of facilitating communication between the respective devices. For example, the signal paths may be embodied as any number of wires, printed circuit board traces, via, bus, point-to-point interconnects, intervening devices, and/or the like. Also, generally speaking, some of the components of the computing devices described above may be incorporated on a motherboard while other components may be communicatively coupled to the motherboard via, for example, a peripheral port.

Figure 2:
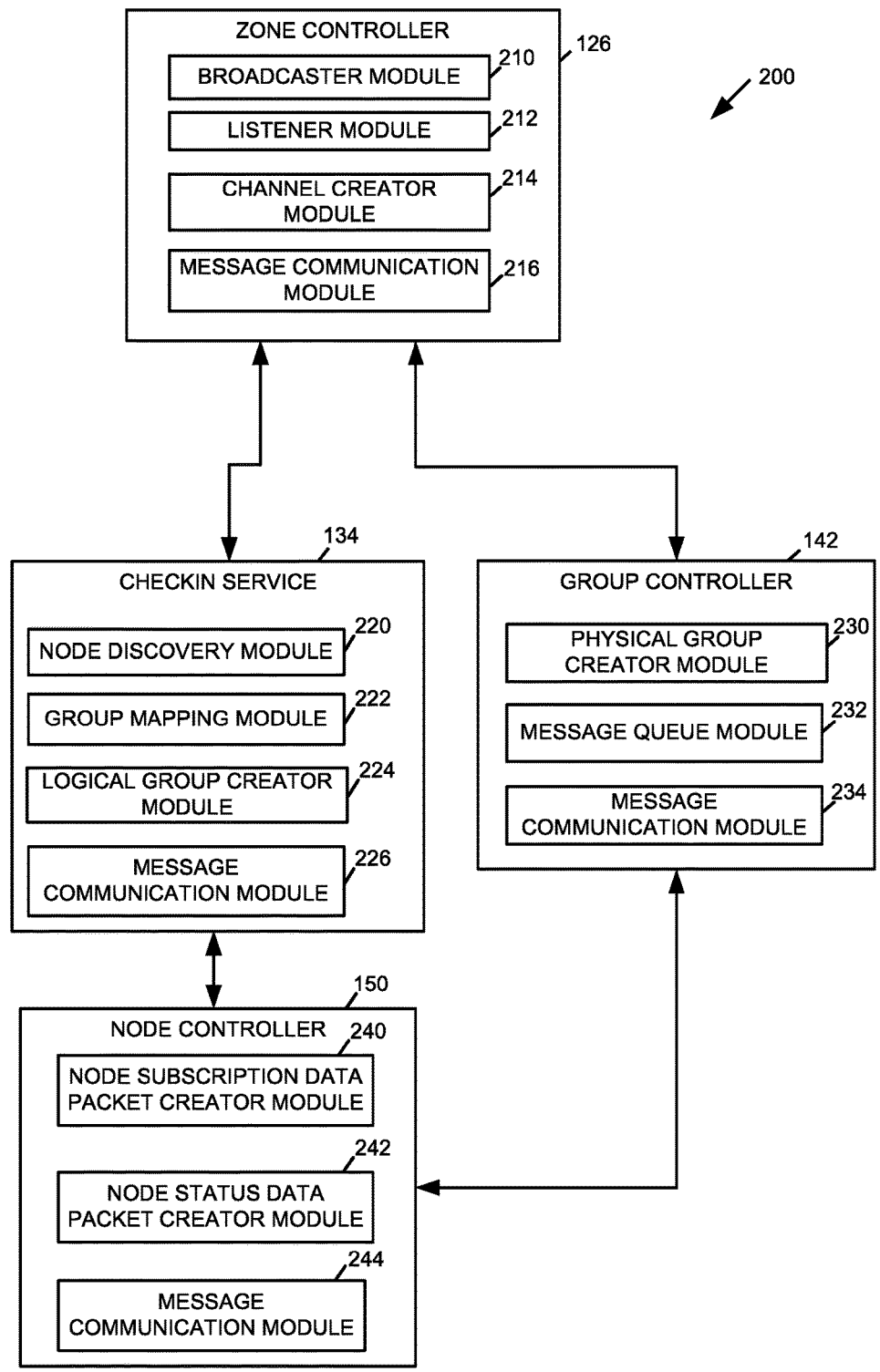
FIG. 2 is a simplified module diagram of at least one embodiment of executable modules of the system of FIG. 1.

Referring now to FIG. 2, in an embodiment 200 of the system 100, each of the illustrative zone controller 126, the checkin service 134, the group controller 140, and the node controller 152 is embodied as one or more computerized modules (e.g., software and/or firmware). The illustrative zone controller 126 includes a broadcaster module 210, a listener module 212, a channel creator module 214, and a message communication module 216. As described below with reference to FIG. 3, in operation, the broadcast and listener modules 210, 212 enable group manager servers 112 and/or node servers 114 to "discover" the existence of the zone manager server 110 and subscribe to its zone 104. The channel creator module 214 creates one or more communication channels configured to receive data packets from group manager servers 112 that have subscribed to the zone 104, for alerting, monitoring, analytics, or other purposes. The message communication module 216 configures the communication circuitry 136 and communication ports 138 to implements a messaging framework capable of handling the communication features described herein. For example, in some embodiments, the message communication module 216 configures the zone controller 126 for communication using a Zeroconf or similar service and a broker messaging framework such as an AMQP or similar protocol.

The illustrative checkin service 134 includes a node discovery module 220, a group mapping module 222, a logical group creator module 224, and a message communication module 226. As described below with reference to FIG. 4, in operation, the modules 220, 222, 224, 226 allow node servers 114 to discover the zone 104, subscribe to it, and be assigned to one or more groups of the zone 104 (e.g., to be associated with one or more group manager servers 112). The message communication module 226 enables the checkin service 134 to listen for messages from node servers 114, and is configured in a similar fashion to the message communication module 216.

The illustrative group controller 142 includes a physical group creator module 230, a message queue module 232, and a message communication module 234. As described below with reference to FIG. 5, in operation, the physical group creator module 230 associates new node servers 114 with their respective physical location in the datacenter 102 (e.g., a rack) by associating the node server 114 with the group identifier 140 of the group manager server 112 of that physical location or rack. In other words, the group controller 142 manages the physical grouping of node servers 114 to which the group manager server 112 belongs. The message queue module 232 creates and manages one or more of the separate message queues 148, to which node servers 114 subscribing to the group can send status data packets, e.g., for monitoring and/or data collection purposes. In some embodiments, a "topic" based routing scheme, such as an AMQP Topic routing procedure, may be used for these data communications.

The message communication module 234 configures the messaging framework at the group manager server 112 to detect new node servers 114 being added to the physical location or rack with which the group manager server 112 is associated or located. In some embodiments, the message communication module 234 may be configured to use a "fanout" or "broadcast" message routing scheme (e.g., an AMQP Fanout or broadcast routing procedure). It should be appreciated that node servers 114 that are added to the group managed by the group manager server 112 may have the same hardware configuration as, or a different hardware configuration from, other node servers in that group, physical location or rack, and indeed, in the zone 104. In other words, any group, rack or other physical location of servers in the zone 104 may be heterogeneous in the sense that it may contain servers that have different hardware configurations, e.g., different processors having one or more different capabilities. As explained below, the processor configurations and capabilities of each node server 114 are made known to the system 100, so that node servers 114 can be assigned to group(s) within the zone based on their processor configurations, capabilities, health data, and/or other factors.

The illustrative node controller 152 includes a node subscription data packet creator module 240, a node status data packet creator module 242 and a message communication module 244. As described below with reference to FIG. 6, the node subscription data packet creator module 240 creates a data packet that contains information about the hardware topology of the node server 114, which can be used by the checkin service 134 to assign the node server 114 to a group in the zone 104. The node status data packet creator module 242 creates a data packet that contains information about the current status or "health" of the node server 114 arranged in a special compressed data format, which can be received by one or more of the message queues 148 of the group manager server 112 for data collection and/or monitoring purposes. The message communication module 244 is configured in a similar fashion to the message communication module 216 described above. As described below with reference to FIG. 6, the message communication module 244 publishes node subscription data packets and node status data packets including the node identifier 150 for receipt by the checkin service 134, using a suitable routing procedure of the implemented messaging framework. For example, in some embodiments, a direct routing procedure, such as an AMQP Direct Protocol or similar mechanism, may be used for such communications.

Figure 3:
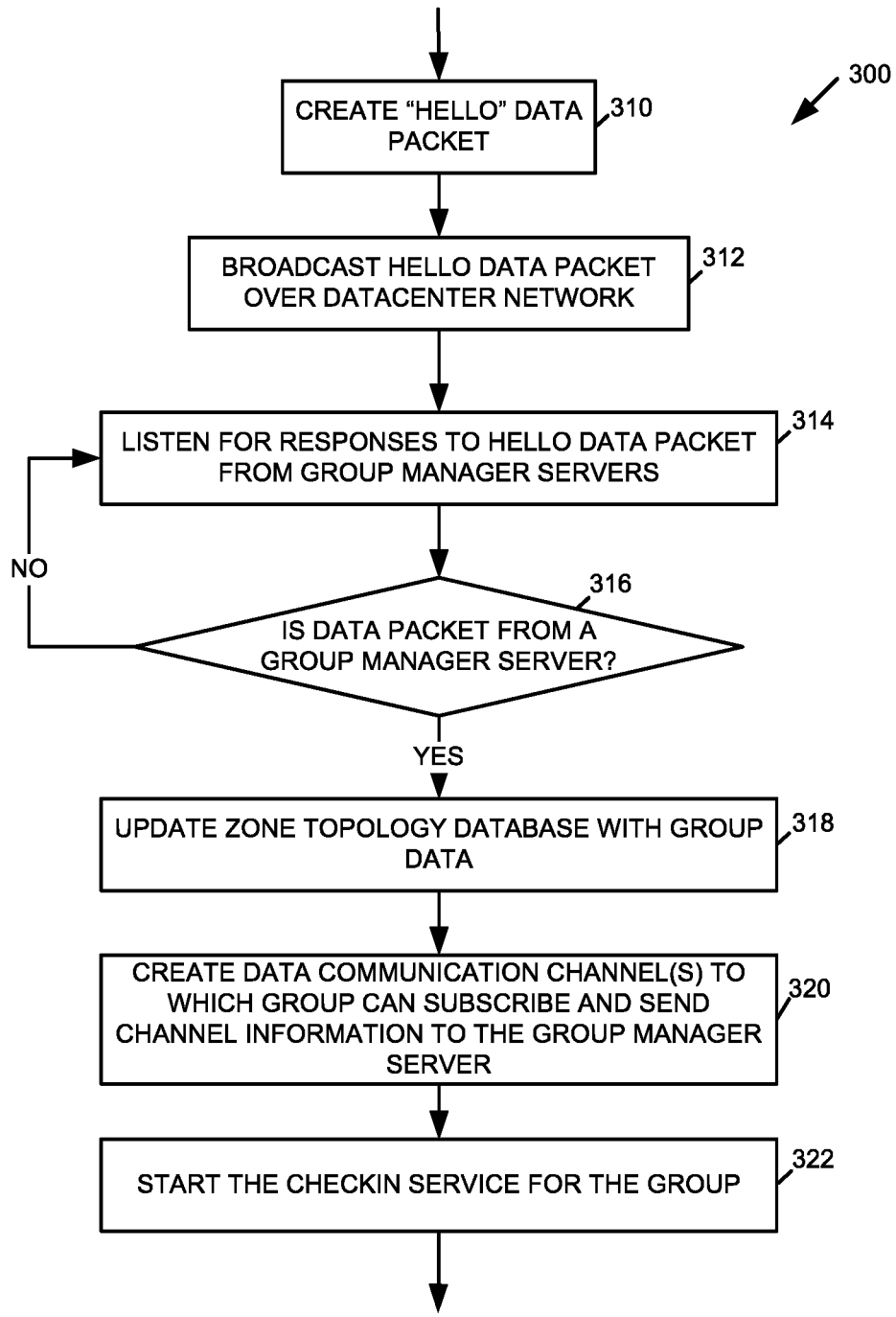
FIG. 3 is a simplified flow diagram of at least one embodiment of a method for adding a group of servers to a zone in the system of FIG. 1.

Referring now to FIG. 3, an illustrative method 300 executable as computerized logic and/or instructions by the various modules of the zone controller 126 to broadcast the existence of the zone manager server 110 to other servers on the network 116, is shown. At block 310, the method 300 creates a "hello" data packet, i.e., a data packet that is configured to identify the zone manager server 110 to other servers in the system 100. The hello data packet (or "zone data packet") includes (e.g., as part of the packet header) the zone identifier 130, which uniquely identifies the zone manager server 110 vis à vis other servers in the system 100. In some embodiments, the zone identifier 130 may be created, e.g., by an administrator of the zone 104 or an administrator of the datacenter 102, using a unique identifier associated with a processor or central processing unit (CPU) of the zone manager server 110 and a hash value provided by the administrator. The illustrative hello data packet also includes a label or tag (e.g., a text label including the word "zone") that identifies the zone manager server 110 as the server that is configured to manage the particular zone 104 (in other words, the server that has the zone controller 126 installed thereon). The illustrative hello data packet further includes the IP address of the zone manager server 110.

At block 312, the method 300 opens a communication port 138 (e.g., a Zeroconf or similar port) and broadcasts the hello data packet to the network 116. At block 314, the method 300 "listens" (using, e.g., a Zeroconf or similar listener) for acknowledgment (ACK) messages that may be issued by one or more group manager servers 112 in response to the hello data packet. The method 300 interprets the ACK messages as requests by the issuing group manager servers 112 to join the zone 104. An ACK data packet generated by a group manager server 112 includes the IP address of the group manager server 112 issuing the ACK message and a label or tag (e.g., a text label including the word "group") that identifies the group manager server 112 as a server that is configured to manage a group of node servers 114 (in other words, a server that has the group controller 146 installed thereon). In this way, the group manager servers 112 can initiate the process of joining the zone 104 (or another zone), in response to their discovering the zone via the broadcast by the zone controller 126 of the hello data packet. Thus, group manager servers 112 can, in some embodiments, be associated with multiple different zones, if they are within the zones' broadcast range.

At block 316, the method 300 determines whether the sender of a given ACK message that has been received at block 314 (e.g., by the listener module 212) is a group manager server 112 (e.g., based on the presence of the text label "group" in the ACK packet header). If the method 300 determines at block 316 that the ACK message was not sent by a group manager server 112, the method 300 ignores the ACK message, returns to block 314, and continues listening for ACK messages from group manager servers 112. If the method 300 determines at block 316 that the ACK message is from a group manager server 112, the method 300 updates that zone topology data 132 at block 318 to reflect that the group manager server 112 sending the ACK message has joined the zone 104. For instance, in some embodiments, the method 300 may parse the IP address and group information from the header of the ACK data packet and store it in one or more data tables of the zone topology data 132.

At block 320, the method 300 creates one or more communication channels to be used for periodically receiving information from the group manager server 112, and designates a communication port 138 for each such channel. In some embodiments, separate communication channels (e.g., AMQP channels) are created for "Alerts," "Policies," and "Analytics," so that communications received by the zone controller 126 can be allocated to a different channel based on the communication type. Similarly, other channels can be created for "Security," "Power," and/or any other category for which it may be desirable to monitor information about the servers in the zone 104. The method 300 sends a "zone subscriber" data packet containing the information for each of the communication channels and its respective communication port 138 to the group manager server(s) 112 that have sent ACK messages to the zone controller 126 in response to the hello data packet. In other words, when a group manager server 112 joins the zone 104, it is provided with communication channel information so that it can periodically report certain types of information to the zone controller 126 on the appropriate channels. In some embodiments, the zone subscriber data packet includes the zone identifier 130 and a port number of the communication port 138 associated with each of the separate communication channels (e.g., alerts, policies, analytics) created by the zone controller 126. In any event, the zone subscriber data packet enables the responding group manager servers 112 to subscribe to the zone 104 for scheduling, monitoring, workload and/or facilities management, and/or other purposes. The establishment of the communication channels allows, potentially, a wide variety of information about the group manager server 112 and/or node servers 114 in its group to be considered by the zone controller 126 in the formation of new groups in the zone 104, and in making scheduling and workload allocation decisions.

At block 322, the method 300 installs one or more instances of the checkin service 134 in different physical locations (e.g., at other server nodes) of the datacenter 102, so that node servers 114 can be discovered and added to the group managed by the group manager server 112 that responded to the hello data packet (and has thereby been added to the zone 104). In the sense that each checkin service 134 can be installed at a different physical location from the zone controller 126, the checkin service 134 may be considered as being analogous to a "client" piece of a client/server computer application.

Each checkin service 134 is configured with a predesignated communication port 138 and a namespace, which indicates the IP address of the server hosting the checkin service 134 and a label or tag (e.g., a text label containing the word "checkin") identifying it as a checkin service. In some embodiments, the checkin service 134 may be implemented as a Zeroconf or similar service. The physical location of the checkin services 134 in the datacenter 102 may be determined in advance, e.g., by a system administrator. As described further below, the checkin services 134 allows node servers 114 to be discovered and added to groups managed by the various group manager servers 112 in the zone 104.

Figure 4:
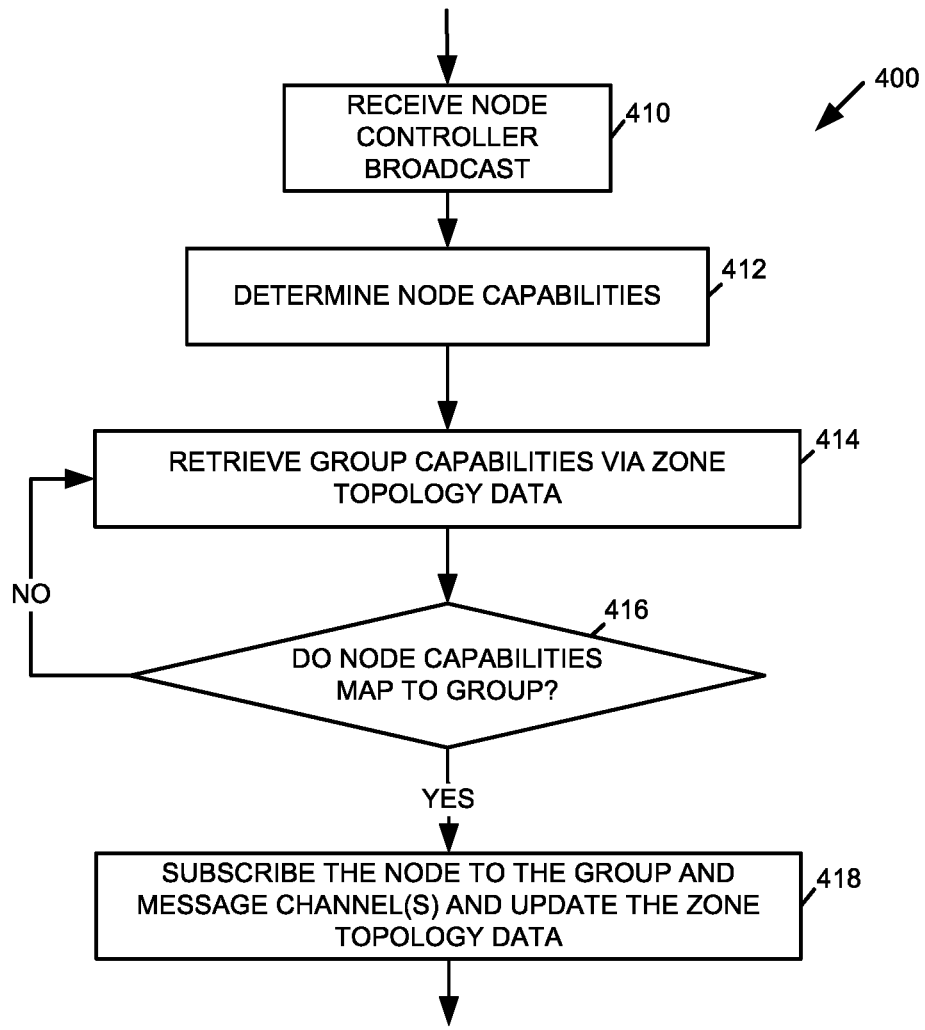
FIG. 4 is a simplified flow diagram of at least one embodiment of a method for adding a server node to a group in the system of FIG. 1.

Referring now to FIG. 4, an illustrative method 400 executable as computerized logic and/or instructions by the checkin service 134 to add a node server 114 to a logical group of servers (e.g., a group that is formed based on functionality, hardware topology, server health, and/or other parameters as opposed to physical location) is shown. The checkin service 134 is configured to monitor the communication of node subscription data packets from node servers 114 that are within a defined range of IP addresses, which may be specified by a system administrator, or may simply include the IP addresses of all of the node servers 114 that are within broadcast range of the checkin service 134. The checkin service 134 maintains group manager data 135, which includes a data table or other suitable data structure that contains the IP addresses of all of the group manager servers 112 and their respective communication channel information (e.g., port number, channel type), as assigned by the zone controller 126. At block 410, the method 400 opens the communication port 156 to listen for node subscription data packets from node servers 114 (e.g., messages that have a "node" tag in the packet header). When a packet with a "node" tag is received, at block 412 the method 400 determines the node identifier 150 (which may need to be decoded using cryptographic techniques, as should be appreciated by those skilled in the art) and creates a node hardware topology map based on the information contained in the node identifier 150. Using the node topology map, the method 400 formulates a node capability identifier, which includes information about the node's hardware capabilities, such as its CPU family, memory technology, type of network interface, and/or other characteristics of the server hardware. In other words, the node capability identifier may be derived from the node identifier 150.

At block 414, the method 400 uses the group manager data 135 to access relevant portions of the zone topology data 132 to retrieve hardware topology information associated with the group or groups managed by the checkin service 134. More specifically, in some embodiments, each unique combination of hardware topology information (e.g., CPU family, memory technology, type of network interface, etc.) is associated with a pre-generated unique group identifier 140. For instance, in some embodiments, the zone topology data 132 includes table entries that map the concatenation of relevant hardware characteristics (e.g., "CPU family+memory technology+type of network interface") with unique group identifiers. At block 416, the method 400 compares the node's capability identifier (e.g., a concatenation of CPU family+memory technology+type of network interface) with the information obtained from the zone topology data 132, to obtain the group identifier 140 with which to associate the node server 114. At block 416, the method 400 continues comparing the node's capability identifier to information in the zone topology data 132 until a suitable match is found. Based on the node's capability identifier and the zone topology data 132, the node server 114 is assigned to a group within the zone 104. At block 418, the method 400 sends the group identifier 140 and its associated message channels 148 to the node server 114 (using, e.g., an AMQP Direct Address Protocol or similar mechanism) and to the zone controller 126 to update the zone topology data 132.

Figure 5:
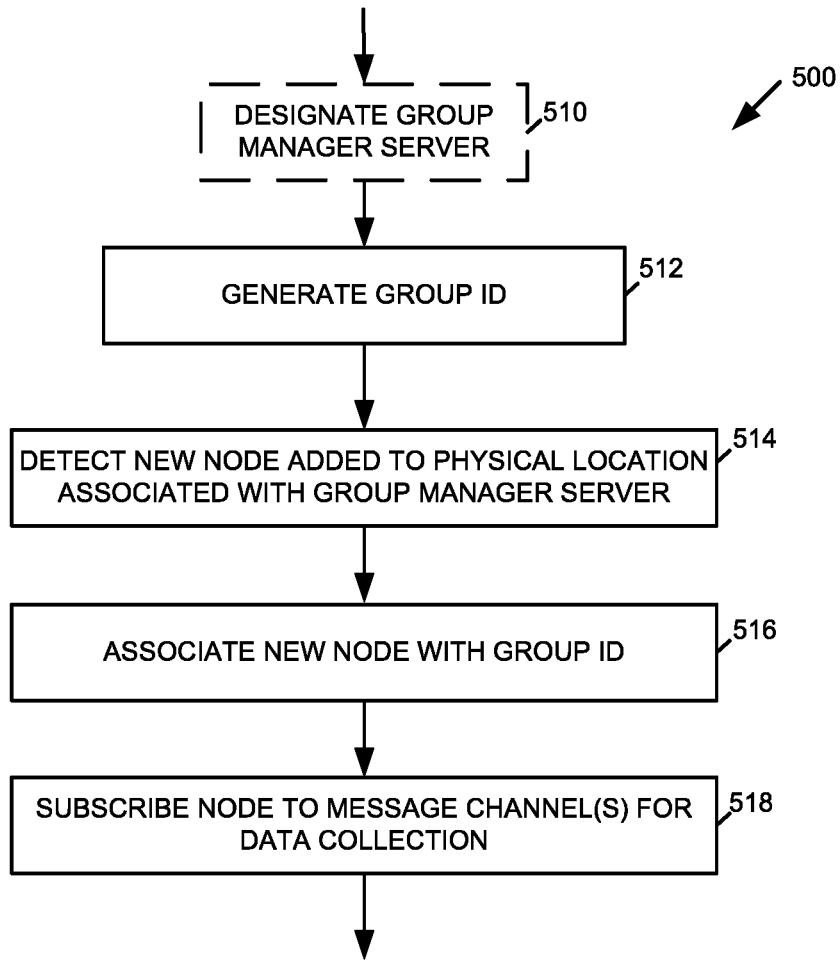
FIG. 5 is a simplified flow diagram of at least one additional embodiment of a method for adding a server node to a group in the system of FIG. 1.

Referring now to FIG. 5, an illustrative method 500 executable as computerized logic and/or instructions by the group controller 142 to define a new physical group of servers to the system 100 or add a new node server 114 to a physical group, is shown. At block 510, a system administrator (i.e., a person), designates one server in a physical grouping of servers (e.g., a rack) as the group manager server 112; that is, the server that will host the group controller 142. Block 510 is shown in dashed lines to illustrate that it is typically a step that is performed by a person, although it may be automated in some embodiments. At block 512, the method 500 generates the group identifier 140 for the group managed by the group manager server 112. In some embodiments, the group identifier 140 may be generated using a random unique identifier. In other embodiments, the group identifier 140 may be generated using a portion (e.g., the first 24 bits) of the IP address of the group manager server 112 that all of the servers in the group will have in common.

At block 514, the method 500 detects (e.g., via an AMQP broker or similar mechanism) a new node server 114 being added to the physical location with which the group manager server 112 is associated (e.g., the rack in which the group manager server 112 is located). When the method 500 detects a node server 114 as being added, the method sends a data packet containing the group identifier 140 to the IP address of the node server 114 at block 516. In some embodiments, an AMQP broker or similar mechanism may be used as an intermediary to facilitate this communication.

As noted above, the group controller 142 manages a number of message queues or channels 148 that it uses to collect data from node servers 114 that have subscribed to its group. These message queues 148 may be referenced by a namespace that includes the group identifier 140 and a descriptor that indicates a particular data collection purpose. For instance, separate message queues may be hosted by the group controller 142 for, among other things, performance metrics, health alerts (e.g., alerts relating to the health of a particular server, in terms of throughput, quality of service, and/or other factors), health actions (e.g., actions taken in response to a health alert), and/or others. At block 518, the method 500 may subscribe the newly added node server 114 to the message queues 148 in a similar fashion to block 418 described above.

Figure 6:
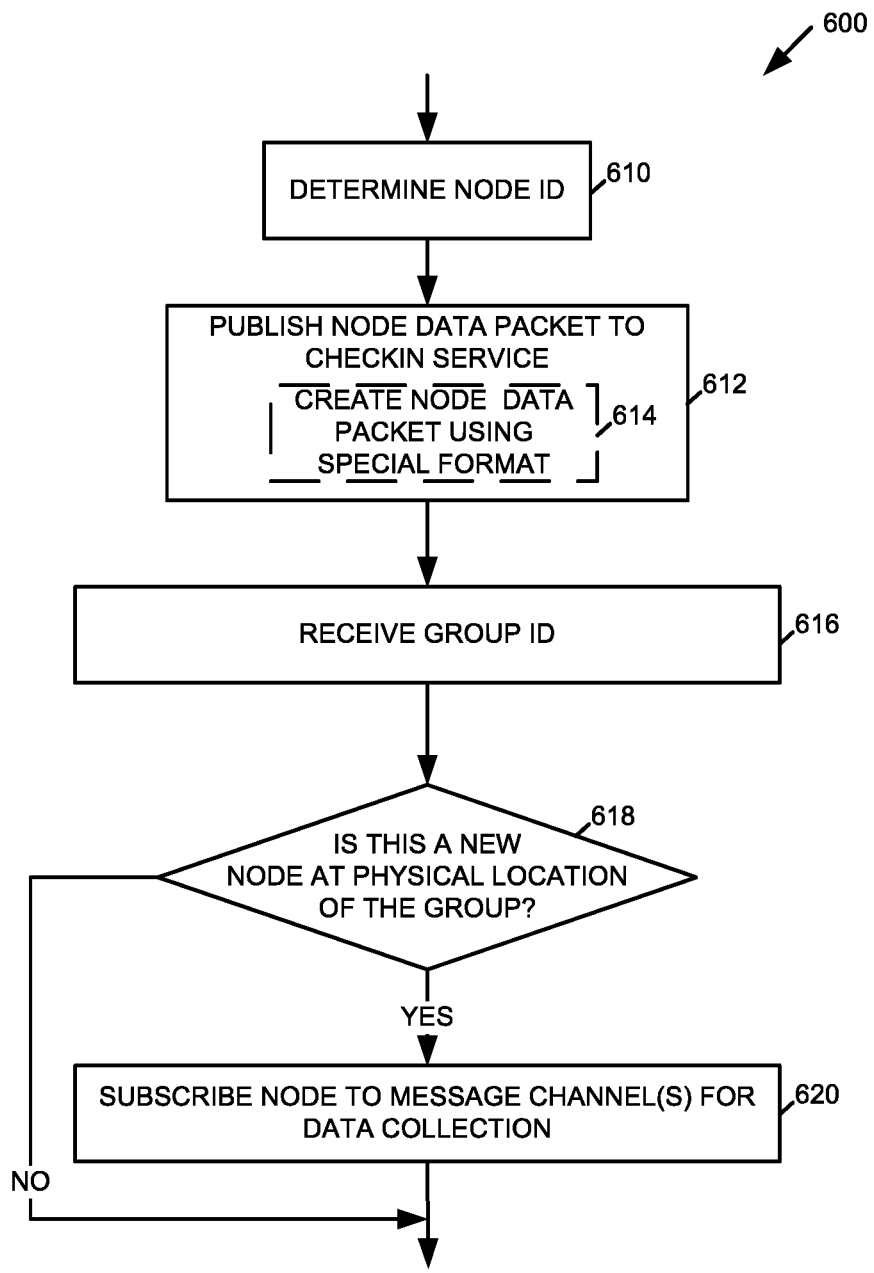
FIG. 6 is a simplified flow diagram of at least one embodiment of a method for enabling a server node to subscribe to one or more groups in the system of FIG. 1.

Referring now to FIG. 6, an illustrative method 600 executable as computerized logic and/or instructions by the node controller 152 to communicate with the system 100 is shown. At block 610, the method 600 determines the unique node identifier 150 for the node server 114 (e.g., obtains the node identifier from the server's chipset). At block 612, the method 600 formulates and publishes a node status data packet, which includes, in addition to the node identifier 150 and encrypted tag (which may contain the node capability identifier described above), data relating to other various characteristics of the node that the associated group controller 142 may be monitoring via the message queues 148. The node status data packet is sent to a checkin service 134 that has the node's IP address in the range of IP addresses that it has been configured to monitor (using, e.g., an AMQP Direct Protocol or similar mechanism).

In some embodiments, at block 614, the method 600 may formulate the node status data packet to use a special compressed data format to store indicators of node health. In some embodiments, indicators of node health (e.g., CPU temperature, available memory, errors, etc.), node quality of service, or other monitored parameters, are represented in a fixed-length bit field of, for example, 24 bits. Where indicators of node health are detected (e.g., using various sensors that are coupled to the node server 114 in ways that should be understood by those skilled in the art), threshold values are set in advance to indicate when each particular indicator exceeds an acceptable range or otherwise needs attention. In the illustrative bit field, each bit represents one of the monitored parameters or health components, and a bit change (e.g., from 0 to 1 or vice versa) indicates that the parameter has exceeded its pre-defined threshold. As one example, if a "node health" bit field has a value of "10110101," this may indicate that 5 out of the 8 monitored parameters are currently operating outside the acceptable range. In this way, real-time information about how particular node servers 114 are performing can be factored into group assignment decisions and/or scheduling decisions.

At block 616, the method 600 receives the group identifier 140 associated with the group manager server 112 managing the group to which the node server 114 is subscribed from the checkin service 134 or from the group controller 142. At block 618, the method 600 may determine whether the node server 114 is a new node being added to a physical location in the zone 104 (e.g., the rack managed by the group manager server 112), and if so, at block 620, subscribe the node server 114 to the group manager server 112's message queues 148 to push node data packets for data collection purposes. If the node server 114 is not newly added to a physical location but is involved in an automatic group formation (via the checkin service 134), then block 620 is skipped.

In this way, logical groups of servers in a zone 104 can be automatically formed on the fly, e.g., as functionality requirements and/or processor capabilities or other parameters change during the operation of the system 100, irrespective of the physical locations of the servers in the datacenter 102.

EXAMPLES

Illustrative examples of the devices, systems, and methods disclosed herein are provided below. An embodiment of the devices, systems, and methods may include any one or more, and any combination of, the examples described below.

In one example, a zone server for use in a cloud datacenter environment including a communication network and at least one group server includes a zone controller configured to broadcast a zone data packet identifying the zone server to the network, listen for acknowledgement data packets issued by one or more group servers in response to the zone data packet, and subscribe a group server to a zone managed by the zone server in response to receipt of an acknowledgment data packet from the group server. In an example, the zone controller may include a broadcast module to broadcast the zone data packet to the network, where the zone data packet includes a zone identifier uniquely distinguishing the zone server from other servers in the datacenter environment and a tag identifying the zone server as manager of the zone. In an example, the zone controller may include a listener module to receive a plurality of data packets in response to the zone data packet and determine whether any of the plurality of data packets were issued by a group server. In an example, the zone controller may include a channel creator module to create at least one communication channel configured for data communication with the group server. In an example, the at least one communication channel may include a first communication channel configured to receive data communications from the group server corresponding to a first communication type, a second communication channel configured to receive data communications from the group server corresponding to a second communication type, and a third communication channel configured to receive data communications from the group server corresponding to a third communication type. In an example, the first communication type may include alerts, the second communication type may include policies, and the third communication type may include analytics. In an example, the zone server may include a checkin service to subscribe at least one node server to a group managed by the group server.

In another example, a method for associating a group server with a zone server associated with a zone of a cloud datacenter environment includes broadcasting a zone data packet comprising data identifying the zone server to the cloud datacenter environment; listening for acknowledgement data packets issued by one or more servers in the cloud datacenter environment in response to the zone data packet; determining whether any acknowledgment data packets are issued by the group server; and subscribing the group server to the zone associated with the zone server in response to determining that an acknowledgement data packet is issued by the group server. In an example, the method may include sending a data packet including a plurality of communication channel information to the group server in response to determining that the acknowledgement data packet is issued by the group server. In an example, the method may include initiating a checkin service to subscribe node servers to a group managed by the group server in response to determining that the acknowledgement data packet is issued by the group server. In a further example, a computing device may include at least one processor; and computer circuitry coupled to the at least one processor, the computer circuitry being arranged to cause the at least one processor to perform the foregoing method. In another example, at least one computer accessible storage medium includes a plurality of instructions that in response to being executed result in a computing device performing the foregoing method.

In an example, a server for use in a cloud datacenter environment including a communication network, a group server, and at least one node server includes a checkin service configured to open a communications port to listen for node subscription messages issued by node servers, determine hardware topology information about a node server from a node subscription message issued by the node server, and assign the node server to a group managed by the group server based on the hardware topology information. In an example, the hardware topology information may include central processing unit family data, memory technology data, and/or type of network interface data. In an example, the checkin service may be configured to access a group data table associating group identifiers with hardware topology information and compare the hardware topology information of the node server with hardware topology information in the group data table.

In another example, a method for associating a node server with a group server associated with a zone of a cloud datacenter environment includes receiving a data packet from a node server; determining, from the data packet, hardware configuration information about the node server; comparing the hardware configuration information for the node server with hardware configuration associated with one or more group servers; and subscribing the node server to a group managed by a group server in response to comparing the hardware configuration information for the node server with the hardware configuration associated with the group server. In an example, the method may include sending a group identifier associated with the group server to the node server. In an example, the method may include comparing at least one of central processing unit family data, memory technology data, and type of network interface data of the node server to at least one of central processing unit family data, memory technology data, and type of network interface data associated with the one or more group servers.

In a further example, a computing device may include at least one processor; and computer circuitry coupled to the at least one processor, where the computer circuitry may be arranged to cause the at least one processor to perform the foregoing method. In another example, at least one computer accessible storage medium includes a plurality of instructions that in response to being executed may result in a computing device performing the foregoing method.

In an example, a group server for use in a cloud datacenter environment comprising a communication network, associated with a physical location in the cloud data center environment, includes a group controller configured to detect a new node server at the physical location, send a group identifier to the new node server to associate the new node server with a group managed by the group server, and subscribe the new node server to a plurality of message channels for data communication, where each of the message channels corresponds to a different type of data being collected by the group controller for monitoring purposes. In an example, the plurality of message channels may include a first message channel to receive data relating to metrics from the node server, a second message channel to receive data relating to server health from the node server, and a third message channel to receive data relating to alerts from the node server.

In another example, a method for associating a node server with a group server associated with a physical location in a cloud datacenter environment includes detecting the node server as being newly added to the physical location; generating a group identifier associated with the group server; sending the group identifier to the node server in response to detecting the node server at the physical location; and configuring a plurality of message queues at the group server, each message queue to receive data packets of a different type from the node server. In an example, the method may include sending the group identifier to the node server through a broker intermediary.

In a further example, a computing device may include at least one processor; and computer circuitry coupled to the at least one processor, where the computer circuitry may be arranged to cause the at least one processor to perform the foregoing method. In another example, at least one computer accessible storage medium includes a plurality of instructions that in response to being executed may result in a computing device performing the foregoing method.

In another example, a node server for use in a cloud datacenter environment including a communication network and a group server includes a node controller configured to publish, to the network, a node data packet comprising a node identifier uniquely distinguishing the node server from other servers on the network, node capability information, where the node capability information comprises data relating to one or more hardware capabilities of the node server, and node status information, where the node status information may include data relating to at least one of server health, power capabilities, and quality of service. In an example, the node controller may be configured to receive a group identifier associated with the group server in response to the node data packet. In an example, the node controller may be configured to formulate the node status information using a fixed-length bit field, wherein each bit in the bit field indicates whether an indicator of node health has exceeded a threshold. In an example, the bit field may include a maximum length in the range of about 24 bits.

In a further example, a method for subscribing a node server to a group in a cloud datacenter environment comprising a communication network includes publishing information about at least one of hardware capabilities and health status of the node server to the network; and receiving a group identifier associating the node server with a group in the cloud datacenter environment in response to publishing the information about the hardware capabilities and/or the health status of the node server to the network. In an example, the method may include formulating information about the health status of the node server using a compressed data format including a fixed-length bit field in which each bit indicates whether a health status indicator exceeds a threshold. In a further example, a computing device may include at least one processor; and computer circuitry coupled to the at least one processor may be arranged to cause the at least one processor to perform the foregoing method. In an example, at least one computer accessible storage medium may include a plurality of instructions that in response to being executed may result in a computing device performing the foregoing method.

In an example, a method for managing servers in a zone of a cloud datacenter environment includes receiving data relating to one or more hardware capabilities of a node server in the zone from the node server; assigning the node server to a first group of servers in the zone in response to the one or more hardware capabilities; receiving data relating to one or more server health parameters of the node server; and assigning the node server to a second group of servers in the zone in response to the one or more server health parameters. In an example, the method may include broadcasting information relating to the zone to the cloud datacenter environment and receiving data from the node server in response to the broadcasting. In an example, a computing device may include at least one processor; and computer circuitry coupled to the at least one processor, where the computer circuitry may be being arranged to cause the at least one processor to perform the foregoing method. In an example, at least one computer accessible storage medium may include a plurality of instructions that in response to being executed may result in a computing device performing the foregoing method.

In an example, at least one machine accessible storage medium includes a plurality of instructions that in response to being executed result in a computing device broadcasting a zone data packet comprising data identifying the zone server to the cloud datacenter environment; listening for acknowledgement data packets issued by one or more servers in the cloud datacenter environment in response to the zone data packet; determining whether any acknowledgment data packets are issued by the group server; and subscribing the group server to the zone associated with the zone server in response to determining that an acknowledgement data packet is issued by the group server.

In an example, the at least one machine accessible storage medium may include sending a data packet comprising a plurality of communication channel information to the group server in response to determining that the acknowledgement data packet is issued by the group server. In an example, the at least one machine accessible storage medium may include initiating a checkin service to subscribe node servers to a group managed by the group server in response to determining that the acknowledgement data packet is issued by the group server.

While the concepts of the present disclosure have been illustrated and described in detail in the drawings and foregoing description, such an illustration and description is to be considered as exemplary and not restrictive in character, it being understood that only illustrative embodiments have been shown and described and that all changes and modifications consistent with the disclosure and recited claims are desired to be protected.

The invention claimed is:

1. A zone manager server for use in a cloud datacenter environment comprising a communication network and at least one group manager server, the zone manager server comprising:
   one or more processors; and
   one or more memory devices having stored therein a plurality of instructions that, when executed by the one or more processors, cause the zone manager server to:
      receive a node subscription data packet from a node server of a plurality of node servers communicatively coupled to the zone manager server, wherein the node subscription data packet includes a unique node identifier;
      determine a node capability identifier for the node server based on the unique node identifier, wherein the node capability identifier includes hardware capability information of the node server;
      associate a group identifier with the node server based on the node capability identifier;
      identify a group manager server communicatively coupled to the zone manager server as a function of the group identifier; and
      assign the node server to the group manager server based on the group identifier, wherein the assigned node server is managed by the group manager server.

2. The zone manager server of claim 1, wherein the plurality of instructions further cause the zone manager server to:
   receive a plurality of node subscription data packets, wherein each of the plurality of node subscription data packets is received from a different one of the plurality of node servers and includes a node identifier, and
   generate a node hardware topology map based on each of the received node identifiers, wherein to determine the node capability identifier further comprises to determine the node capability identifier based on the node hardware topology map.

3. The zone manager server of claim 2, wherein the group identifier comprises a unique pre-generated group identifier based on the node hardware topology map.

4. The zone manager server of claim 2, wherein the plurality of instructions further cause the zone manager server to transmit the group identifier and one or more associated message channels to the node server.

5. The zone manager server of claim 2, wherein the plurality of instructions further cause the zone manager server to update the node hardware topology map based on the group identifier and one or more associated message channels.

6. The zone manager server of claim 1, wherein the group identifier comprises a unique combination of hardware topology information.

7. The zone manager server of claim 1 wherein the plurality of instructions further cause the zone manager server to parse a header of the node subscription data packet to determine the unique node identifier.

8. A zone manager server for use in a cloud datacenter environment comprising a communication network and at least one group manager server, the zone manager server comprising:
   communication circuitry to receive a node subscription data packet from a node server of a plurality of node servers communicatively coupled to the zone manager server, wherein the node subscription data packet includes a unique node identifier; and
   a checkin service to (i) determine a node capability identifier for the node server based on the unique node identifier, wherein the node capability identifier includes hardware capability information of the node server, (ii) associate a group identifier with the node server based on the node capability identifier, (iii) identify a group manager server communicatively coupled to the zone manager server as a function of the group identifier, and (iv) assign the node server to the group manager server based on the associated group identifier, wherein the assigned node server is managed by the group manager server.

9. The zone manager server of claim 8, further comprising a zone controller to generate a node hardware topology,
   wherein the checkin service is further to receive a plurality of node subscription data packets, wherein each of the plurality of node subscription data packets is received from a different one of the plurality of node servers and includes a node identifier,
   wherein the zone controller is to generate a node hardware topology map based on each of the received node identifiers, and
   wherein to determine the node capability identifier further comprises to determine the node capability identifier based on the node hardware topology map.

10. The zone manager server of claim 9, wherein the group identifier comprises a unique pre-generated group identifier based on the node hardware topology map.

11. The zone manager server of claim 9, wherein the communication circuitry is further to transmit the group identifier and one or more associated message channels to the node server.

12. The zone manager server of claim 9, wherein the zone controller is further to update the node hardware topology map based on the group identifier and one or more associated message channels.

13. The zone manager server of claim 8, wherein the group identifier comprises a unique combination of hardware topology information.

14. The zone manager server of claim 8, wherein the checkin service is further to parse a header of the node subscription data packet to determine the unique node identifier.

15. A node server for use in a cloud datacenter environment, the node server comprising:
   one or more processors; and
   one or more memory devices having stored therein a plurality of instructions that, when executed by the one or more processors, cause the node server to:
      determine a unique node identifier of the node server, wherein the unique node identifier uniquely distinguishes the node server from other servers communicatively coupled to a zone manager server via a network;
      transmit a node status data packet to the zone manager server communicatively coupled to the node server via the network, wherein the node status data packet includes the unique node identifier;
      receive, in response to having transmitted the node status data packet, a group identifier of a group manager server communicatively coupled to the node server via the network, wherein the group identifier is usable to identify the group manager server;
      determine, in response to having received the group identifier, whether the node server is presently subscribed to the group manager server; and subscribe, in response to a determination that the node server is not presently subscribed to the group manager server, to one or more message queues of the group manager server.

16. The node server of claim 15, wherein the plurality of instructions further cause the node server to:
    establish, in response to having subscribed to the one or more message queues, one or more communication channels between the node server and the group manager server, wherein each of the communication channels corresponds to each of the one or more message queues; and
    transmit additional node status data packets of the node server to the group manager server via the one or more communication channels.

17. The node server of claim 15, wherein to determine whether the node server is presently subscribed to the group manager server comprises to determine whether the node server is presently subscribed to the one or more message queues of the group manager server.

18. The node server of claim 15, wherein the node status data packet further includes a plurality of characteristics of the node server,
    wherein the plurality of characteristics of the node server includes at least one of node capability information and node status information,
    wherein the node capability information comprises data relating to one or more hardware capabilities of the node server, and
    wherein the node status information comprises data relating to at least one of a health of the node server, power capabilities of the node server, and a quality of service of the node server.

19. The node server of claim 15, wherein the plurality of characteristics are usable by the node server to determine whether health of the node server has been compromised.

20. A node server for use in a cloud datacenter environment, the node server comprising:
    a node controller to determine a unique node identifier of the node server, wherein the unique node identifier uniquely distinguishes the node server from other servers communicatively coupled to a zone manager server via a network; and
    communication circuitry to (i) transmit a node status data packet to the zone manager server communicatively coupled to the node server via the network, wherein the node status data packet includes the unique node identifier and (ii) receive, in response to having transmitted the node status data packet, a group identifier of a group manager server communicatively coupled to the node server via the network, wherein the group identifier is usable to identify the group manager server,
    wherein the node controller is further to (i) determine, in response to having received the group identifier, whether the node server is presently subscribed to the group manager server and (ii) subscribe, in response to a determination that the node server is not presently subscribed to the group manager server, to one or more message queues of the group manager server.

21. The node server of claim 20, wherein the communication circuitry is further to:
    establish, in response to having subscribed to the one or more message queues, one or more communication channels between the node server and the group manager server, wherein each of the communication channels corresponds to each of the one or more message queues; and
    transmit additional node status data packets of the node server to the group manager server via the one or more communication channels.

22. The node server of claim 20, wherein to determine whether the node server is presently subscribed to the group manager server comprises to determine whether the node server is presently subscribed to the one or more message queues of the group manager server.

23. The node server of claim 20, wherein the node status data packet further includes a plurality of characteristics of the node server,
    wherein the plurality of characteristics of the node server includes at least one of node capability information and node status information,
    wherein the node capability information comprises data relating to one or more hardware capabilities of the node server, and
    wherein the node status information comprises data relating to at least one of a health of the node server, power capabilities of the node server, and a quality of service of the node server.

* * * * *